United States Patent
Takahashi et al.

(10) Patent No.: US 7,421,697 B2
(45) Date of Patent: *Sep. 2, 2008

(54) INFORMATION PROCESSING APPARATUS HAVING SIMPLIFIED USER SWITCHING FUNCTION AND PROGRAM USED THEREFOR

(75) Inventors: Kazuaki Takahashi, Tokyo (JP); Lisen Chen, Tokyo (JP)

(73) Assignee: Sony Corporation, Tokyo (JP)

( * ) Notice: Subject to any disclaimer, the term of this patent is extended or adjusted under 35 U.S.C. 154(b) by 547 days.

This patent is subject to a terminal disclaimer.

(21) Appl. No.: 10/245,653

(22) Filed: Sep. 16, 2002

(65) Prior Publication Data

US 2003/0069919 A1    Apr. 10, 2003

(30) Foreign Application Priority Data

Sep. 18, 2001 (JP) ............................. 2001-283145
Aug. 27, 2002 (JP) ............................. 2002-246389

(51) Int. Cl.
    *G06F 9/46* (2006.01)
(52) U.S. Cl. .................. 718/107; 715/750; 715/778
(58) Field of Classification Search ................ 719/310, 719/320, 329; 718/108, 733, 100, 102, 103, 718/107; 713/1, 100, 300, 321; 715/733, 715/750, 778; 714/24
    See application file for complete search history.

(56) References Cited

U.S. PATENT DOCUMENTS

| | | | | |
|---|---|---|---|---|
| 5,600,776 A | * | 2/1997 | Johnson et al. | 715/733 |
| 5,606,702 A | * | 2/1997 | Diel et al. | 719/329 |
| 6,237,092 B1 | * | 5/2001 | Hayes, Jr. | 713/100 |
| 6,396,515 B1 | * | 5/2002 | Hetherington et al. | 715/762 |
| 6,763,379 B1 | * | 7/2004 | Shuster | 709/224 |
| 6,795,967 B1 | * | 9/2004 | Evans et al. | 719/310 |
| 6,826,755 B1 | * | 11/2004 | Kabir et al. | 718/108 |

FOREIGN PATENT DOCUMENTS

| | | |
|---|---|---|
| JP | 07-28544 | 1/1995 |
| JP | 07-28616 | 1/1995 |
| JP | 10-283323 | 10/1998 |
| JP | 11-25040 | 1/1999 |
| JP | 2003-517672 | 5/2003 |

* cited by examiner

*Primary Examiner*—Van H Nguyen
(74) *Attorney, Agent, or Firm*—Robert J. Depke; Rockey, Depke & Lyons, LLC

(57) ABSTRACT

In a simplified user switching function for switching to another user without terminating an application of a current user, data of an application started up a user before switching is included and temporarily stored in a temporary storage file. Data generated by using an application started up a user A who is currently inactive as a result of user switching (user being in a logged-on state but the desktop changed to that of another user) is stored temporarily at the time of the user switching. Thus, even when a user B (currently active user) after the user switching performs a shutdown operation or the like, the data of the currently inactive user A can be protected securely. Also, when the writing time is set unchanged, transistor size of the TFTs provided in the pixel circuit can be reduced.

20 Claims, 11 Drawing Sheets

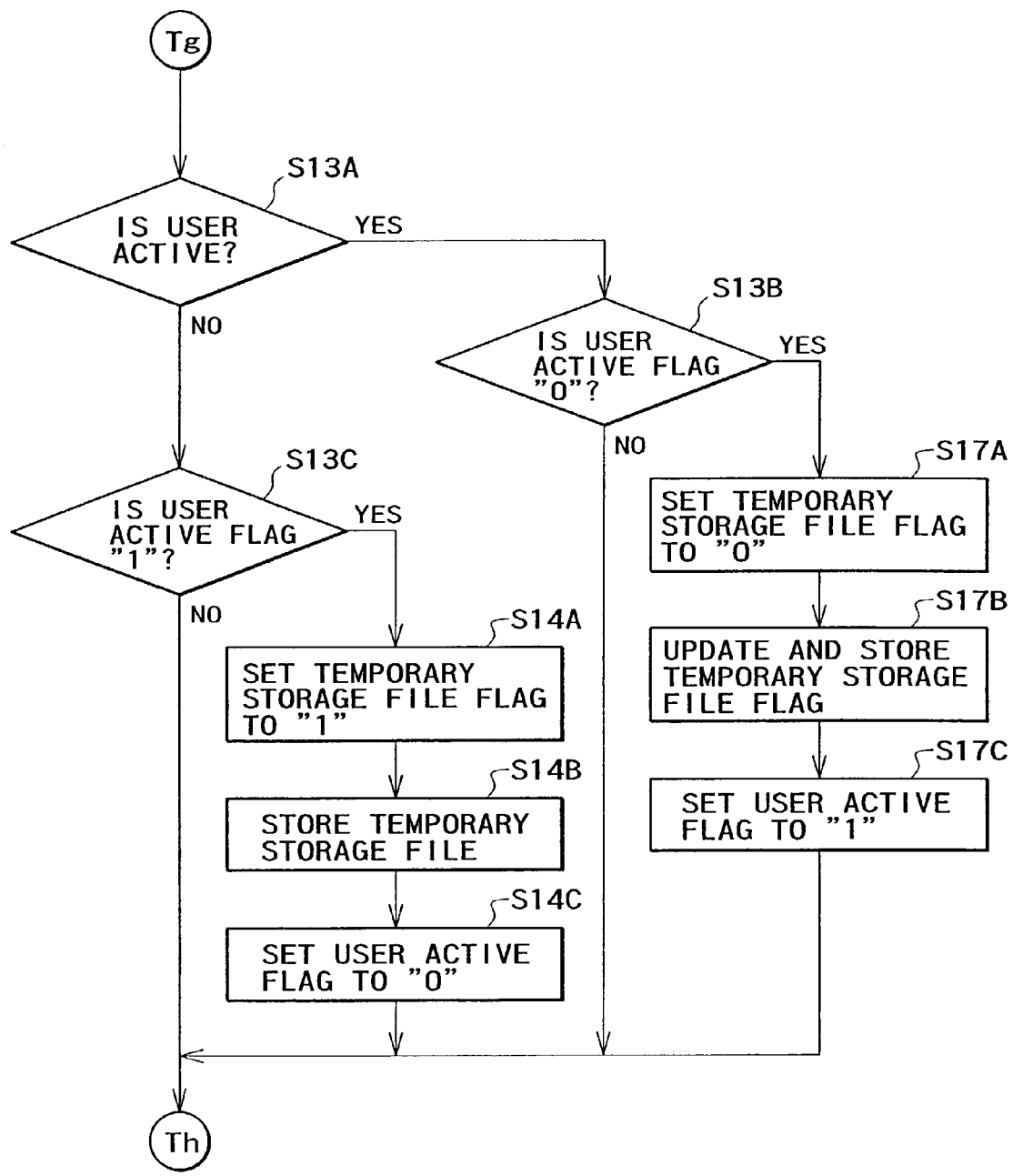

INFORMATION PROCESSING APPARATUS HAVING SIMPLIFIED USER SWITCHING FUNCTION AND PROGRAM USED THEREFOR

This application claims priority to Japanese Patent Application Numbers JP2001-283145 and JP2001-246389 filed on Sep. 18, 2001 and Aug. 27, 2002 respectively and each of which are incorporated herein by reference.

BACKGROUND OF THE INVENTION

The present invention relates to a technique for reliably protecting data being generated by a user on an apparatus including an operating system having a simplified user switching function.

Among multiuser and multitasking-capable operating systems used in computer systems, an operating system having a simplified user switching function (for example Windows XP: trademark of Microsoft Corp.) is known which provides a convenient function (function on a local computer) when a single computer is used by a plurality of people. Specifically, without requiring log-off by a user, the operating system allows switching to another user while in a log-on state after personal identification through input of a password or the like. The operating system therefore provides an advantage in that when the single computer is shared by a family, for example, the same application can be used while each member of the family changes the desktop (working space on a computer screen).

When a user of a conventional apparatus executes a desired application (for example word processing or image processing software) on an operating system (hereinafter referred to simply as an "OS") having the simplified user switching function, data of the application of a user being logged on to the computer but not active (previous user when the desktop is switched to that of the other user) may be lost. Therefore, the data is not protected adequately.

Suppose that an OS having the simplified user switching function is installed in a single computer, and that two or more users are registered with the computer, for example.

Suppose that a user A is doing a work using an application program (described as "P"), and that concentrating too much on the work and forgetting to store data, the user A has not yet stored data in a file. When the user A leaves the computer in that state and switching from the user to another user B is performed to use an application, the following procedure is generally used.

1. Operation of switching to the user B
2. Switching to a via screen ("Welcome Screen" to be described later)
3. Logging on of the user B
4. Starting up the application by the user B At this time, the user A is in a logged-on state (process of the application and the like is not ended and is being performed), but the user A is not active (∵ the desktop is changed to that of the user B). When the user B is to perform a shutdown operation to turn off the computer, a message from the OS to the following effect is displayed on the screen, for example.

"Another person is logged on to this computer. Shutting down the OS may cause data of the person to be lost. Proceed with the shutdown? [Yes] [No]"

This is display content of a dialog box appearing on the screen to ask the user B for a positive or negative answer. When [Yes] is chosen, the possibility of loss of the data of the application program P started up by the user A is increased.

The user B (currently active user) can store data of the application started up himself/herself anytime before performing the shutdown operation. However, when the user B looks at the message before the shutdown operation and fortunately realizes that the data of the application program P started up the user A needs to be stored, the user B needs to ask the user A a password, perform user switching to the user A, and then store the data of the application program P on behalf of the user A (there is a problem in terms of security) The only alternative for the user B is to find the user A, bring the user A to the computer, and perform user switching to the user A so that the user A himself/herself stores the data.

Of course, some applications have a function of automatically storing data at fixed time intervals. For example, when a timer operated at predetermined time intervals or time intervals specified by the user is used to automatically store a backup file at appropriate times, it is possible to obtain data up to a point in time when the file was stored. However, when the automatic storing function is not set or the time intervals of the timer are set long, for example, the data cannot be stored reliably.

At the time of a shutdown, a message notifying the shutdown is issued from the OS to all the applications of all the users. Therefore, when a function of storing data within the application of an inactive user is activated as it is, the application can automatically store data when receiving the message. However, when there is a large amount of data to be stored, or the shutdown time is very short (a forced shutdown by a user, power cutoff or the like), for example, the shutdown may be performed before the storing of the data is completed.

Such problems always present a danger of losing the data of an inactive user, and thus make the simplified user switching function less easy to use.

SUMMARY OF THE INVENTION

It is accordingly an object of the present invention to securely store data of a user in an information processing apparatus having the simplified user switching function.

In order to achieve the above object, according to the present invention, at the time of simplified user switching, data of an application started up a user before the switching is temporarily stored in a temporary storage file.

Therefore, according to the present invention, at the time of simplified user switching, the data generated by using the application started up the user who is currently inactive as a result of the user switching (the user being in a logged-on state but the desktop changed to that of another user) is stored temporarily. Thus, even when the other user to whom the switching is performed (currently active user) performs a shutdown operation, the data of the currently inactive user can be protected securely. In addition, since the data is temporarily stored at the time of simplified user switching rather than at the time of a shutdown, no problem is presented even when there is a large amount of data to be stored or the shutdown time is short.

BRIEF DESCRIPTION OF THE DRAWINGS

FIG. 11 is a diagram showing a portion of the processing related to temporary storage of data.

DETAILED DESCRIPTION OF PREFERRED EMBODIMENTS

Figure 1:
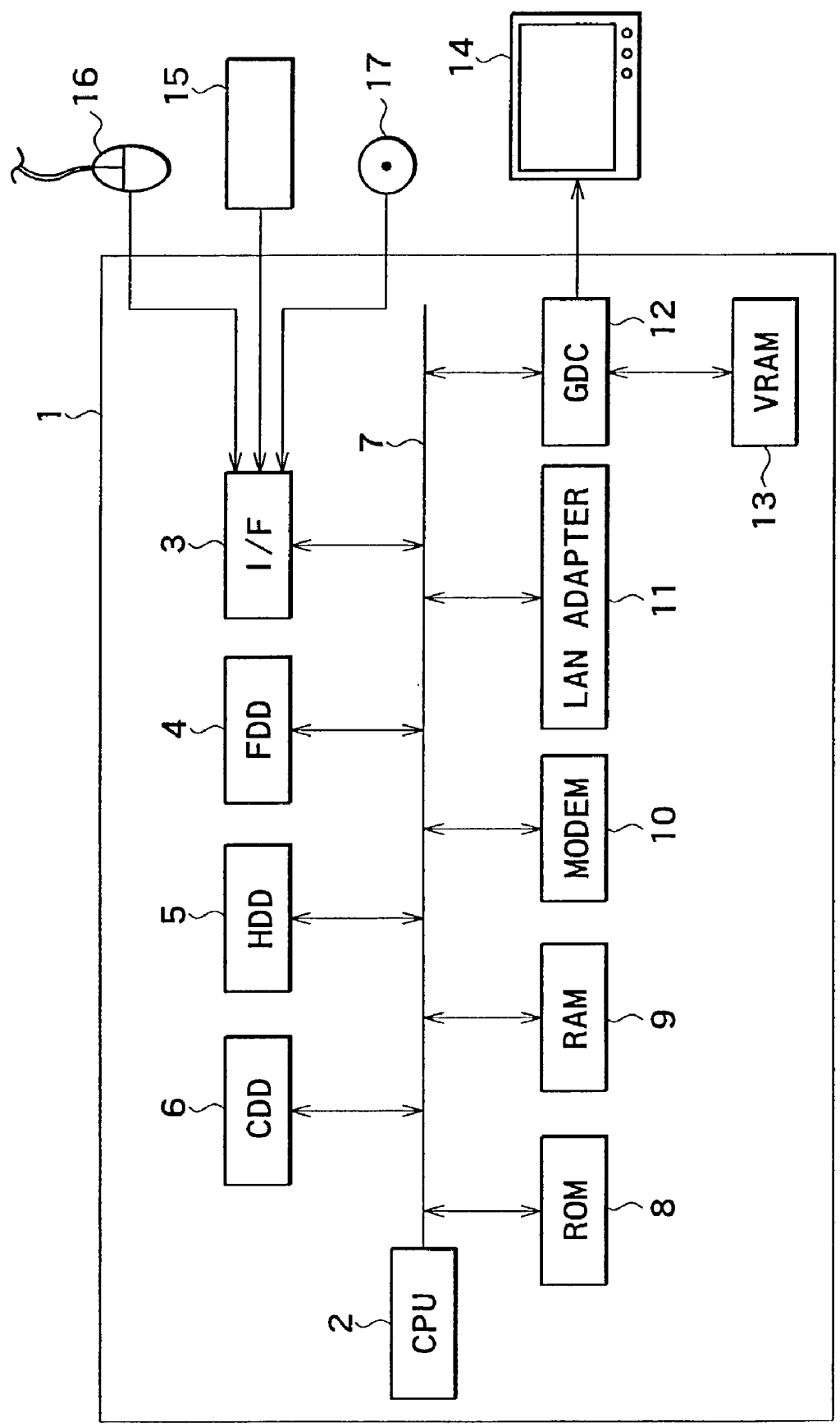
FIG. 1 is a diagram showing an example of hardware configuration.

The present invention relates to an information processing apparatus having a simplified user switching function. The present invention is for example applied to a computer having a multiuser and multitasking-capable OS installed therein, a video or audio processing apparatus, a measuring apparatus and the like that each have the function.

Before description of a hardware configuration and software processing, meanings of terms used in the present specification will be clarified first.

Definitions of the following terms will be described.
(a) "Function of simplified user switching" (or simplified user switching function)
(b) "The user is active (or not active)," and "active (inactive) user"
(c) "Welcome Screen"

First, (a) is a function provided by a multiuser-ready OS. This function allows the entire desktop (a working space on a computer screen) to be switched, without terminating an application (process) started up a current user, to that of another user by selecting or carrying out an item of "user switching." Hence, unlike user switching by ordinary log-on (or log-in) and log-off (or log-out), the function allows user switching to be performed easily.

Since the function eliminates a need for a time to load the application at the time of user switching into memory, the function provides an advantage of requiring less time than the switching by the log-off and log-on, and thus enables a relatively quick processing.

Incidentally, the function itself is commonly known, and is referred to as "Fast User Switching" in the "Windows XP," for example. Although description in the following will be made with specific reference to this OS, applications of the present invention are not limited to a specific OS; the present invention is applicable to any OS (UNIX-like OS or the like) having a similar function. User switching in the following description refers to the user switching in the "simplified user switching function."

"The user is active" in the above item (b) refers to a state in which the user is logged on and the desktop of the user is displayed on the screen. The "active user" refers to the user in the case where "the user is active." The "active user" is allowed to issue an instruction or a command to the started application at any time.

On the other hand, "the user is not active" refers to a state in which the user is logged on and the desktop of the user is not displayed on the screen. The "inactive user" refers to the user in the case where "the user is not active." The "inactive user" is not allowed to issue an instruction or a command to the application until user switching to the user himself/herself is performed.

It is to be noted that a user who is not logged on is not referred to as active or inactive. In addition, since the above definitions are merely fundamental, the definitions may not be strictly proper depending on a specific OS (definitions in the case of "Windows XP" will be described later with reference to FIG. 2). However, this improperness is attributed to specifications and various other reasons and is therefore not fundamental.

"Welcome Screen" of the above item (c) appears at the time of switching from a user to another user when the simplified user switching function is active. The screen for example allows selection of a user (registered user), input of a password or the like, shutdown, standby, reboot and the like. A simplified user switching always goes through the "Welcome Screen" (in that sense, the "Welcome Screen" is a screen via which user switching is performed).

Cases in which the simplified user switching function is active include for example: a case in which the setting of the simplified user switching function is possible in a system management utility such as Control Panel and the simplified user switching function is set active (that is, a case in which a right to the setting is granted to the user); a case in which the simplified user switching function is active from the beginning; and a case in which only a specific user (system manager or the like) has a right to set the simplified user switching function active or inactive.

An environment for executing an application will next be described.

FIG. 1 shows an example of hardware configuration of an apparatus.

A computer as an information processing apparatus 1 has, under a CPU (Central Processing Unit) 2 as a control center, an interface unit 3 (described as I/F in the figure), a drive unit 4 (described as "FDD" in the figure) for a detachable magnetic disk (flexible disk or the like), a drive unit 5 (described as "HDD" in the figure) for a non-detachable fixed disk (so-called hard disk), and a drive unit 6 (described as "CDD" in the figure) for a detachable optical reading disk (optical disk, magneto-optical disk or the like). These units are connected to the CPU 2 via an internal bus 7. In addition, the computer has a ROM (Read Only Memory) 8 and a RAM (Random Access Memory) 9, a modem (described as "MODEM" in the figure) 10 for connection to a public telephone line, a LAN (Local Area Network) adapter 11, and a display device controller 12 (described as "GDC" in the figure). Each of these units is connected to the CPU 2 via the internal bus 7. A video RAM 13 (described as "VRAM" in the figure) required for image processing is attached to the display device controller 12. The display device controller 12 thus sends a video signal to a display unit 14 (a liquid crystal display, a cathode-ray tube (CRT) or the like).

A keyboard 15, a mouse 16, a dial control unit 17 are provided as control means. Control information from these means is processed via the interface unit 3.

Incidentally, in addition to the above means, a pointing device (a tablet input device or the like) and an additional or optional device can be provided as required. However, the showing in the figure and description of such devices will be omitted.

As described above, regarding the simplified user switching function, lack of sufficient measures to protect data can cause the following inconveniences.

Data of a user A is not guaranteed when switching to another user B is performed before the user A stores the data and the user B performs a shutdown or the like.

An automatic storing function alone of an application itself cannot be said to be sufficient for data protection.

A method of storing data immediately before a shutdown cannot complete the storing of the data when there is a large amount of data (for example data in a graphic file or an image file or the like) or there is only a short time before the shutdown.

Thus, according to the present invention, at the time of simplified user switching, data of an application started up a user before the switching is temporarily stored as a temporary storage file in a recording device (an auxiliary storage device, a dedicated nonvolatile memory or the like).

Specifically, since the temporary storage file is stored at the time of simplified user switching, there are a sufficient time required for switching to another user and a sufficient time before processing for a shutdown or the like is performed by the other user or yet another user even when there is a large amount of data. Hence, there is an extremely low possibility that there is no time for the storing processing or the like, which leads to failure to store the temporary storage file and thus loss of the data.

The present invention has two embodiments: in one embodiment, an application has the function of storing the temporary storage file from the beginning; and in the other embodiment, an application does not have such a storing function, but processing for realizing the function is possible.

In the former embodiment, data of the application is stored temporarily as a temporary storage file at the time of simplified user switching. Thus, even when an active user performs shutdown processing, the data of an inactive user can be restored by the temporary storage file to thereby protect the data of the user.

The latter embodiment uses a resident application or the like to realize the processing of storing a temporary storage file at the time of simplified user switching. By for example describing and registering in advance the processing for storing a temporary storage file as script processing (or macro processing) and performing the script processing at the time of simplified user switching (or at the time of detection of the switching), even an application not provided with the function of storing a temporary storage file from the beginning can store the data. Specifically, the processing for storing a temporary storage file including the data of the user at the time of user switching is registered on the application or a program (for example a resident program or the like) for performing the processing is set so that the program can be called. It suffices to perform the file storing processing and thereby store a temporary storage file when later simplified user switching makes the user inactive. This is not limited to a particular method; for example, it may be a method of easy registration by key operation, a description type method of registration using a macro language, a script language or the like, or of course a method of description in a shell script.

Permanently remaining temporary storage files may cause shortage of storage capacity. It is therefore desirable to take measures such as updating the same temporary storage file at all times, checking time stamps of the files and deleting the files periodically, or deleting a file according to an instruction from the user (file owner).

A flow of messages of the operating system at the time of simplified user switching will next be described.

Figure 2:
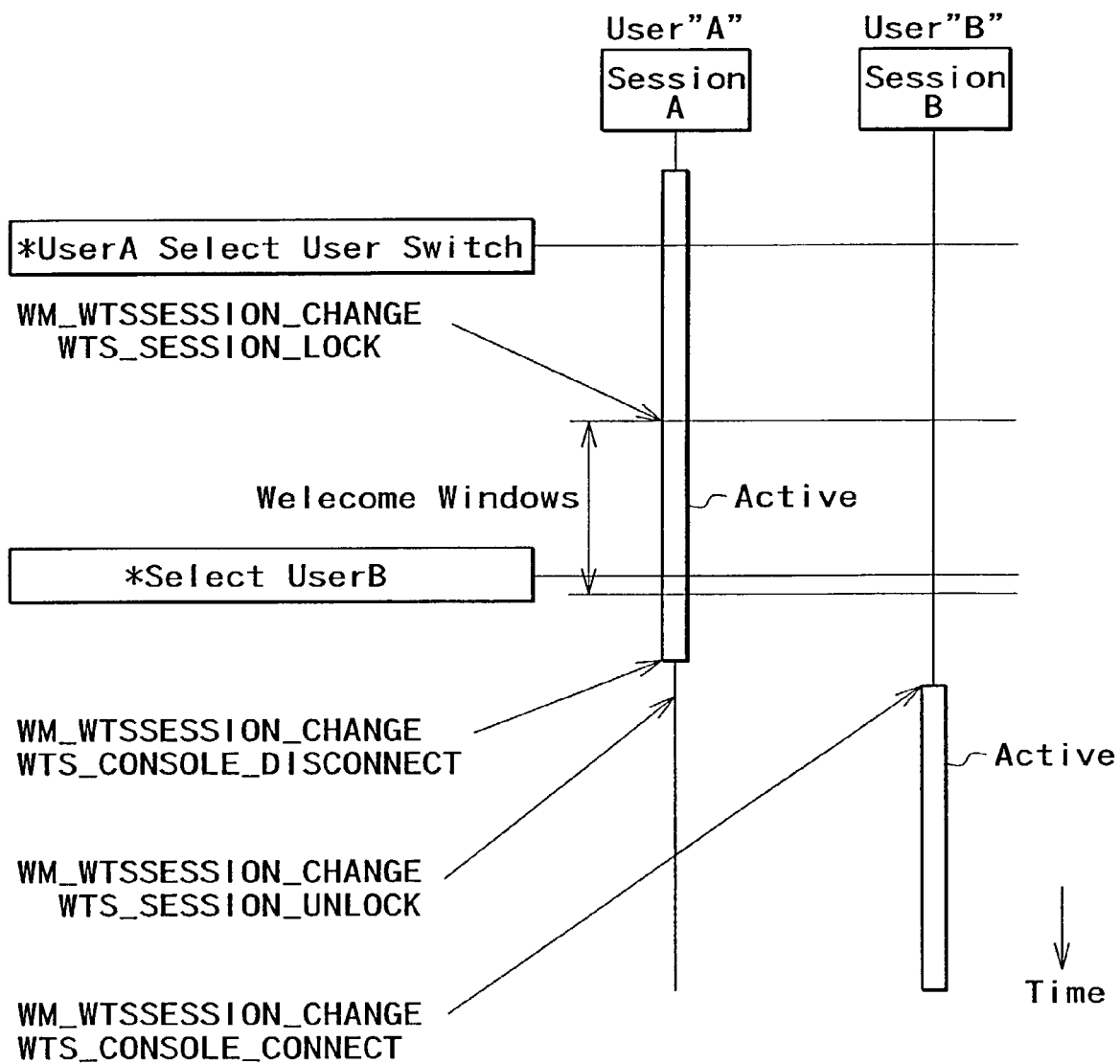
FIG. 2 is a diagram of assistance in explaining switching from a user A to a user B.
Figure 3:
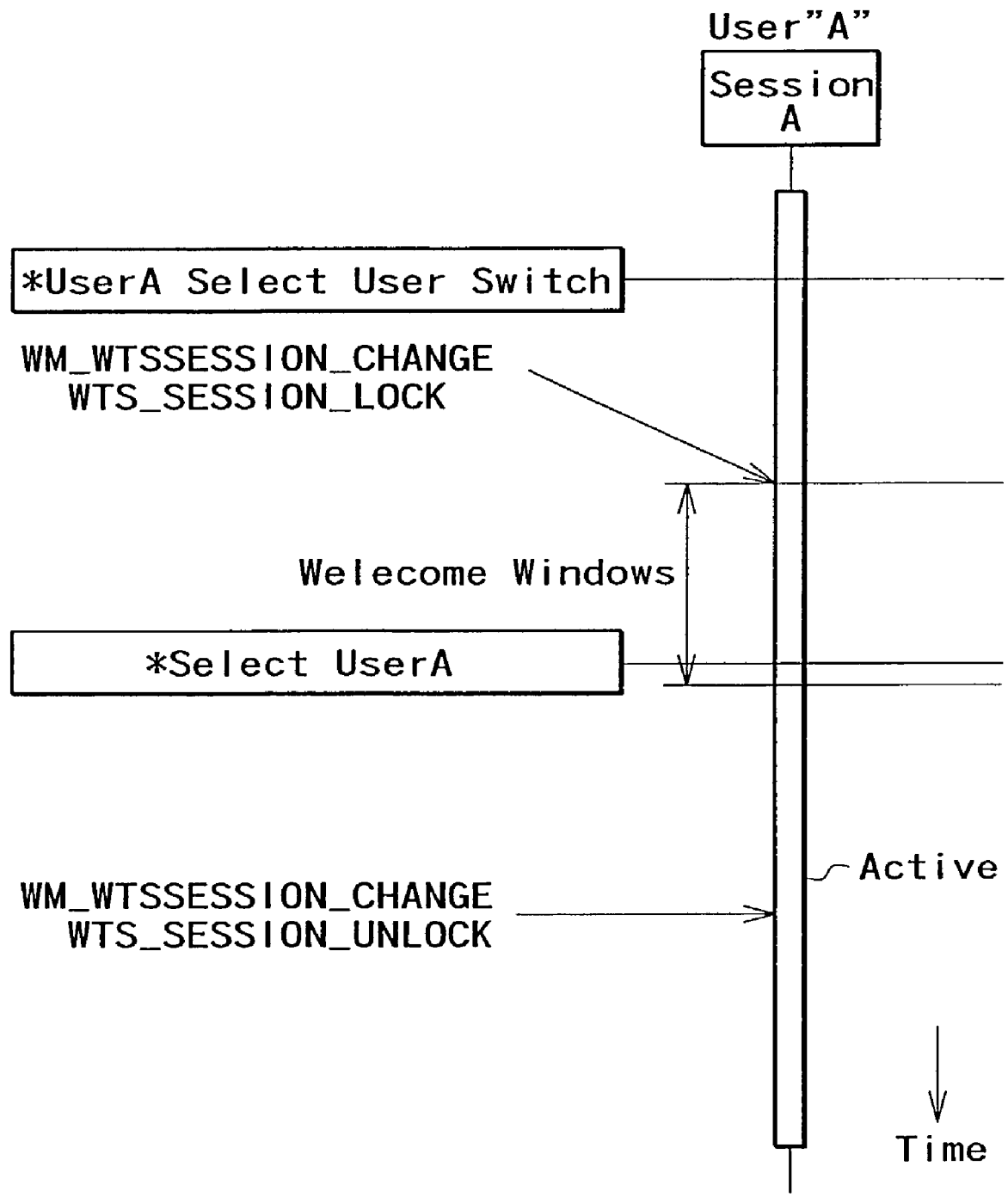
FIG. 3 is a diagram of assistance in explaining switching from a user A to the user A through a "Welcome Screen"

FIG. 2 is a diagram of assistance in explaining switching from a user A (or a session A) to another user B (or a session B) through "Welcome Screen." FIG. 3 is a diagram of assistance in explaining switching from a user A to the user A again through "Welcome Screen." Time passage in the figures is in a vertically descending direction. "Welcome Windows" is a window displaying the "Welcome Screen."

Meanings of symbols used in the figures are as follows.

"WM_WTSSESSION_CHANGE"=a message issued from the OS when a user uses the simplified user switching function or when the OS performs processing related to the simplified user switching function.

When the application side obtains the "WM_WTSSESSION_CHANGE" issued from the OS, the application side can also obtain a parameter added to the message. The following are recited as the parameter.

"WTS_SESSION_LOCK"=a parameter added at the time of locking the desktop of the user for transition to the "Welcome Screen" while the desktop of the user is active. After the message having this parameter added thereto is issued, the desktop cannot be used.

"WTS_SESSION_UNLOCK"=a parameter added at the time of transition from the "Welcome Screen" to another state. The parameter is added when another user makes a transition to the "Welcome Screen" and the desktop of the other user becomes active, or when the user returns from the "Welcome Screen" to the desktop of the user again, for example.

"WTS_CONSOLE_CONNECT"=a parameter added when switching is performed, while the desktop of the user is not active, from another user through the "Welcome Screen" to activate the desktop of the user and the user can issue a command. After the message having this parameter added thereto is issued, the desktop of the user becomes active.

"WTS_CONSOLE_DISCONNECT"=a parameter added when the desktop of another user becomes active (when the session of the user becomes inactive). After the message having this parameter added thereto is issued, the desktop of the user becomes inactive.

In FIG. 2 and FIG. 3, each of the users A and B is either in an active state or in an inactive state. A section indicated by a rectangle long in a vertical direction denotes the active state, while a section of a single line denotes the inactive state. In both of the active state and the inactive state, the users are logged on at all times, and applications started up the users continue operating.

In FIG. 2, the user A is active first. "WM_WTSSESSION_CHANGE" is issued a little time after the user performs an operation for simplified user switching ("User A Select User Switch"). Since the added parameter in this case is "WTS_SESSION_LOCK," the desktop of the user A is locked for a transition to the "Welcome Screen."

Then, switching to the user B is performed by an operation on the "Welcome Screen" ("Select User B"), and after a while, "WM_WTSSESSION_CHANGE" is issued. The added parameter in this case is "WTS_CONSOLE_DISCONNECT," and therefore the desktop of the user A becomes inactive. Up to this point in time, the user A is active. The user B is not active yet.

It is to be noted that while "the user is active" as mentioned above is defined as a state in which the desktop of the user in a logged-on state is displayed on the screen, the active range (period) includes a period from points in time when the window (Welcome Windows) for the "Welcome Screen" is displayed and when the window disappears to a point in time when "WM_WTSSESSTON_CHANGE" (added parameter="WTS_CONSOLE_DISCONNECT") is issued, as shown in FIG. 2. Hence, "the user is active" in the present OS includes the above state, and also means that the user who has performed the operation for simplified user switching is still active even while the "Welcome Screen" is displayed, and that the user becomes inactive when the switching to the other user is performed. Alternatively, the desktop may be considered to be a "desktop" of a user in a broader sense including the "Welcome Screen" at the time of user switching. Incidentally, on the "Welcome Screen," selection of a user, input of a password, shutdown, standby, reboot and the like can be performed using the keyboard or the mouse, but other commands cannot be issued.

In certain timing after issuance of "WM_WTSSESSION_CHANGE" (added parameter="WTS_CONSOLE_DISCONNECT"), "WM_WTSSESSION_CHANGE" is issued again. Specifically, at this point, the parameter added to the message for the user A (session A) is "WTS_SESSION_UNLOCK," and the parameter added to the message for the user B (session B) is "WTS_CONSOLE_CONNECT." Thereafter the desktop of the user B is active and the user B is active.

In FIG. 3, the user A remains active all the time from the beginning. "WM_WTSSESSION_CHANGE" is issued a little time after the user performs an operation for simplified user switching ("User A Select User Switch"). Since the added parameter in this case is "WTS_SESSION_LOCK," the desktop of the user A is locked for a transition to the "Welcome Screen."

Then, the user A is selected by an operation on the "Welcome Screen" ("Select User A"), and after a while, "WM_WTSSESSION_CHANGE" is issued. The added parameter in this case is "WTS_SESSION_UNLOCK," and therefore the user A returns to the desktop of the user.

At and after this point in time, the user A remains active.

Incidentally, there are other cases where after going through a resume state after standby set by the user A, operation is resumed to select the user B (or the user A) through the "Welcome Screen" by the simplified user switching function. However, a basic flow of messages in such cases is the same as that of FIG. 2 and FIG. 3, and therefore description of the messages will be omitted.

FIGS. 4 to 11 show examples of processing when the substance of the present invention is implemented in an application.

A "temporary storage file" (or file for temporary storage) used in the figures is a file for temporarily storing data of a user rendered inactive at the time of simplified user switching. This file is stored in an auxiliary storage device (for example the HDD 5, the CDD 6, or the FDD 4 in FIG. 1), or a nonvolatile memory or the like for saving the data. When the user becomes active and needs the data, the file can be opened by the user.

Preferably, the "temporary storage file" includes not only the data generated or edited by the user but also information (a flag value, an identifying bit, attached data or the like) indicating activity of the temporary storage file. Specifically, the temporary storage file needs to be active not when the user who has generated the data is in an active state but when the user is in an inactive state (for example when another user is in an active state). Accordingly, when simplified user switching renders the user inactive, the information on the activity of the temporary storage file is set to indicate that the temporary storage file is active, and the information is stored together with the data generated by the user. When the user becomes active, the information on the activity of the temporary storage file is set to indicate that the temporary storage file is inactive, and the information is stored.

The temporary storage file has a data structure including the following three pieces of data D1 to D3, for example:

D1=data generated or edited by the user
D2=temporary storage file flag
D3=user identifying information The data D1 has contents generated or edited, for example, by the user, and is required by the user. The data D2 and the data D3 are necessary for realizing the function of the present invention.

The temporary storage file flag denoted by D2 indicates the activity of the temporary storage file. The temporary storage file flag determines whether to restore the data D1 when the application is started next time, and is thus an essential element. When the value of the flag is "0," for example, the value indicates that the user is active and that the temporary storage file is not active, whereas when the value of the flag is "1," the value indicates that the user is not active and that the temporary storage file is active.

The data D3 identifies the user. The data D3 uses a user account name or the like to identify the user storing the temporary storage file. In an embodiment in which the temporary storage file is stored in a separate storage area provided for each user (dedicated directory, folder or the like), the user is identified from the area, and therefore independence between users is maintained (an unauthorized user cannot delete or rewrite a temporary storage file of another user). In that case, the data D3 may be omitted.

There are various embodiments conceivable with respect to processing for data protection using a temporary storage file. For example, the following embodiments are recited.

I) Embodiment that uses a message communication from the OS to store a temporary storage file at the time of simplified user switching (message-driven system)

(II) Embodiment that checks whether the user is active at intervals of a certain time using interval timer interruption or the like and determines whether to store a temporary storage file (timer-driven system)

FIGS. 4 to 7 are a flowchart of an example of processing of the message-driven embodiment (I). It is to be noted that the flowchart illustrates processing that centers on a certain user (user A) (the same is true for FIGS. 8 to 11).

In the present embodiment, the processing at the time of simplified user switching is performed according to the following algorithm using the four cases (four parameters added to "WM_WTSSESSION_CHANGE") mentioned above:

(1) Register a request from the application to the OS that the OS notify the application of a message generated at the time of simplified user switching (2) Receive a message issued from the OS at the time of simplified user switching (3) Check whether the user is active on the basis of the message received in (2)

(4) Set the temporary storage file flag and store the temporary storage file according to whether the user is active In determining whether the user is active, the following two conditions are set.

First, a condition for transition to the Welcome Screen (hereinafter referred to as a "condition A") is that the parameter added when the "WM_WTSSESSION_CHANGE" is issued be "WTS_SESSION_LOCK" (see FIG. 2 and FIG. 3).

Condition A: WM_WTSSESSION_CHANGE wParam=WTS_SESSION_LOCK wherein "wParam" denotes the added parameter. When the condition is satisfied, the condition is true, whereas when the condition is not satisfied, the condition is false.

As described above, in the case of "WTS_SESSION_LOCK," the desktop is locked for transition to the Welcome Screen. The setting of the temporary storage file flag to "1" when the above condition A is true renders the temporary storage file of the user active.

A condition for making the user active (hereinafter referred to as a "condition B") is an initial boot or transition from the "Welcome Screen" to the user. The latter is a case where switching is performed from the user A to the user B through the "Welcome Screen" (the parameter added to "WM_WTSSESSION_CHANGE" is "WTS_CONSOLE_CONNECT"), as shown in FIG. 2, and a case where switching is performed from the user A to the "Welcome Screen" to return to the user A, as shown in FIG. 3.

Specifically, the condition B is as follows.
Condition B:
(Initial Boot)
OR (WM_WTSSESSION_CHANGE wParam=WTS_CONSOLE_CONNECT)
OR [(WM_WTSSESSION_CHANGE wParam=WTS_SESSTON_UNLOCK) AND ("WTSActive" obtained when a function "WTSQuerySessionInformation( )" is called)]

wherein "OR" is equivalent to a logic operator "||," meaning "or"; "AND" is equivalent to a logic operator "&&," meaning "and"; and the function "WTSQuerySessionInformation( )" is provided by Win32API (Application Program Interface), and indicates that the user is active when the function is called and then "WTSActive" is obtained.

The second equation forming the condition B corresponds to the case of FIG. 2 (positions of the users A and B are interchanged), and the third equation corresponds to the case of FIG. 3. In the latter case, "WM_WTSSESSION_CHANGE wParam=WTS_SESSION_UNLOCK" alone is not sufficient, and it is necessary to check that the user A is active when returning from the Welcome Screen.

"wParam" denotes the added parameter. When the condition B is satisfied, the parameter is true, and in this case, the temporary storage file flag is set to "0." When the condition B is not satisfied, the parameter is false.

In short, the condition B is provided to set the temporary storage file flag, which is set to "1" at the time of last transition to the Welcome Screen, to "0" so that the temporary storage file of the active user does not become active.

On the basis of the above description, the following description will be made with reference to FIGS. 4 to 7. At a first step S1 in FIG. 4, the user A starts the application. At a next step S2, registration processing is performed so that a message (WM_WTSSESSTON_CHANGE) is sent from the OS to the application at the time of user switching.

At a step S3, a search is made for a temporary storage file. For example, a folder (storage area) exclusively used for the application and possessed by each user is searched for a temporary storage file.

At a next step S4, whether there is a temporary storage file is determined. When the file exists, the processing proceeds to a step S5 in FIG. 5. When the file does not exist, the processing proceeds to a step S11 in FIG. 6.

At the step S5, contents of the temporary storage file having the above-mentioned data (at least D1 and D2) are checked. The processing then proceeds to a next step S6 to check the state of the temporary storage file flag (that is, the flag value). When the flag value is "1," the processing proceeds to a step S8. When the flag value is "0," the processing proceeds to a step S7.

At the step S7, whether search for contents of all temporary storage files (existing for each application) has been completed is determined. When the contents of all temporary storage files have been checked, the processing proceeds to the step S11 in FIG. 6. When the contents of all temporary storage files have not been checked, the processing returns to the step S5.

At the step S8, dialog display is provided to display for example a message to the following effect for the user on the screen:

"This computer was shut down last time by another user or has not been turned off properly. The application has been forcedly terminated, and so data of the application may have been lost.

The temporary storage file stores the data before transition to the Welcome Screen. Open this temporary storage file XXXX? [Yes] [No]"

Thus, a notification of the cause and possibility of loss of the data and a query to the user as to whether to use the temporary storage file are displayed ("XXXX" is a name of the temporary storage file). It is to be noted that whether to display such a dialog at all times is determined arbitrarily, and accordingly some kinds of applications do not require such display to be produced. For example, the temporary storage file may be read forcedly without such display.

At a next step S9, an operation (that is, "Yes" or "No") of the user is determined. When the user chooses to open the temporary storage file, the processing proceeds to a step S10. When the user chooses not to open the temporary storage file, the processing returns to the step S7.

At the step S10, the temporary storage file is read (loaded) and thereby opened. The processing then returns to the step S7.

Figure 6:
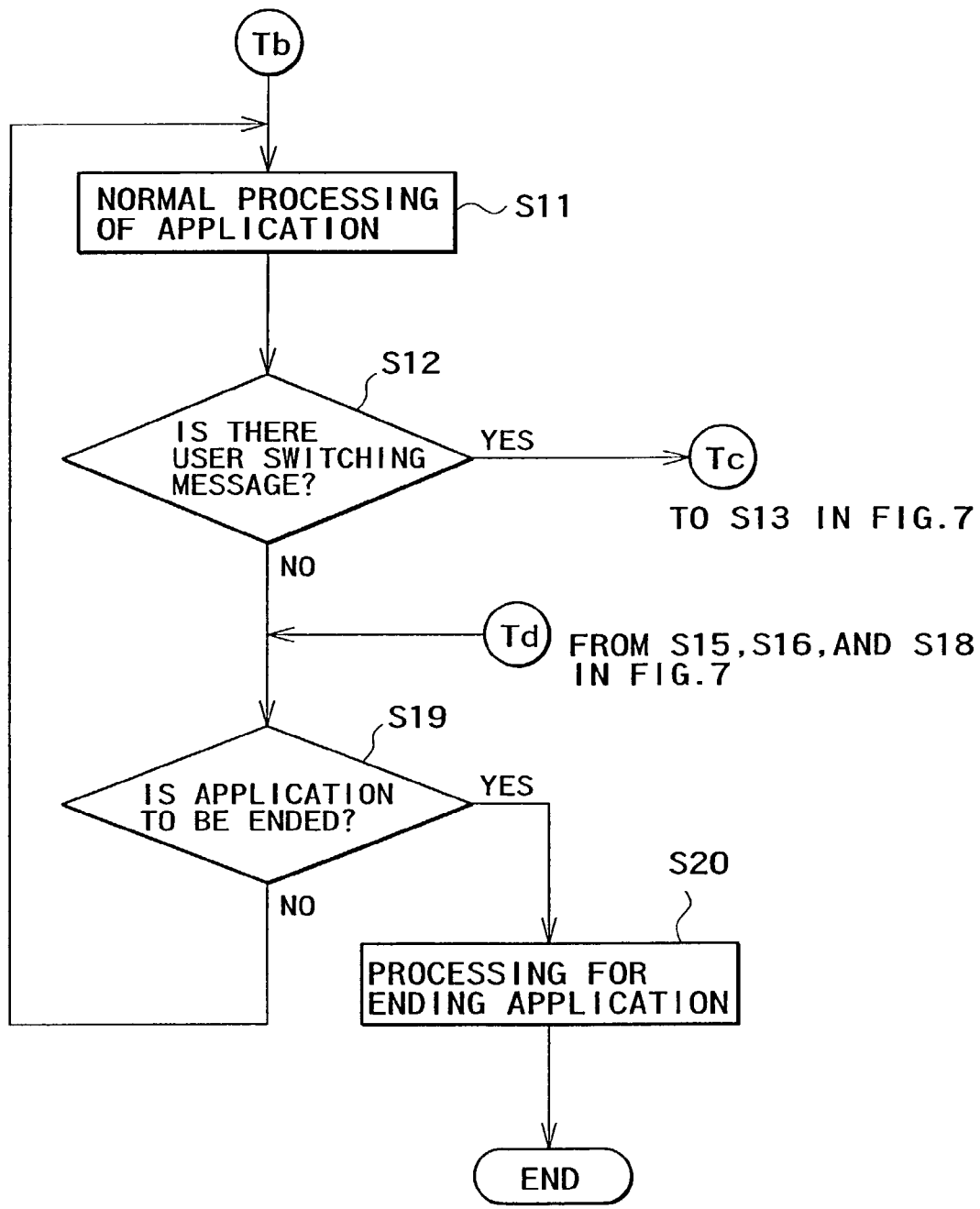
FIG. 6 is a diagram showing the latter half of the processing in conjunction with FIG. 7.

At the step S11 in FIG. 6, the temporary storage file is stored in a different name in a desired folder, for example, and processing (normal processing) is performed by the application.

At a next step S12, whether there will be user switching is determined. Specifically, whether a message providing information that user switching is to be performed has been sent from the OS is determined. More specifically, when a message "WM_WTSSESSION_CHANGE" is issued and the message is received, the processing proceeds to a step S13 in FIG. 7. When the message has not been sent, the processing proceeds to a step S19.

Figure 7:
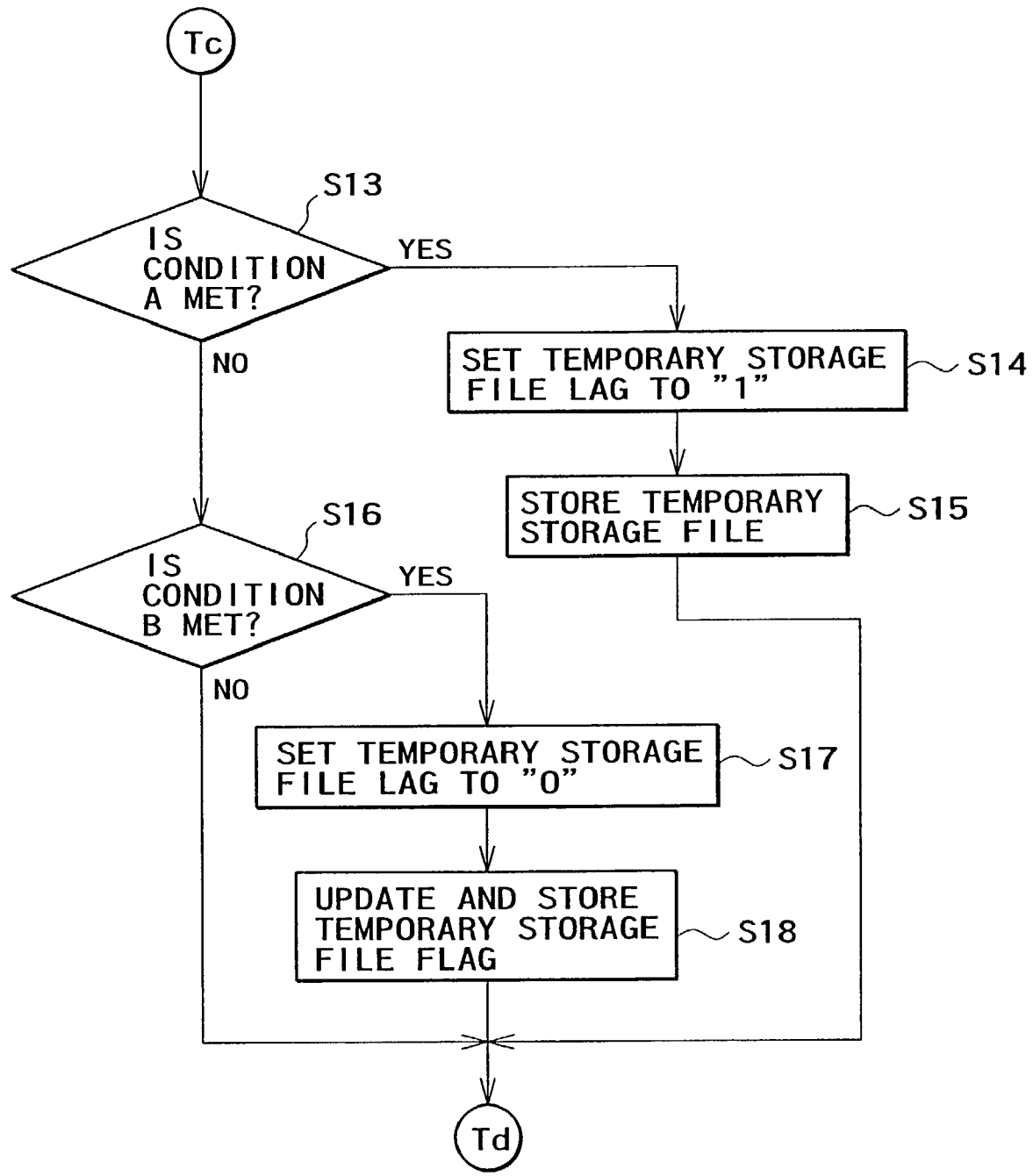
FIG. 7 is a diagram showing a portion of the processing related to temporary storage of data.

At the step S13 in FIG. 7, whether the message indicates transition to the "Welcome Screen" is determined. That is, whether the foregoing condition A is met is determined. When the condition A is met, the processing proceeds to a step S14. When the condition A is not met, the processing proceeds to a step S16.

At the step S14, the temporary storage file flag is set to "1." The processing then proceeds to a step S15 to store the temporary storage file. Specifically, when the temporary storage file is formed by the data D1 (data generated by the user by means of the application), the data D2 (temporary storage file flag), and the data D3 (current user account name), as described above, these pieces of data are stored as the temporary storage file.

Incidentally, when the user has been editing a plurality of files, temporary storage files corresponding to the files are stored, and thus a plurality of temporary storage files are created.

When the user account name is to be used for the data D3, the user account name can be obtained by calling a function provided by Win32API.

Temporary storage files are stored in folders of their respective applications in a folder possessed by each user to thereby prevent names of the temporary storage files from coinciding with each other (that is, to prevent an identical absolute pathname from being shared between users or applications). In order to explicitly show the user the temporary storage file, it is desirable for example to add characters such as "temporary storage file" (or a symbol or the like denoting the temporary storage file) to a current file name attached by the user so that the user can easily distinguish the temporary storage file. Incidentally, when no file name is attached by the user, a file name automatically given by the application or the like may be used so that characters or a symbol representing the temporary storage file is added to the file name.

After the step S15, the processing proceeds to the step S19 in FIG. 6.

At the step S16 in FIG. 7, whether the message indicates transition from the "Welcome Screen" to the user A is determined. That is, whether the foregoing condition B is met is determined. When the condition B is met, the processing proceeds to a step S17. When the condition B is not met, the processing proceeds to the step S19 in FIG. 6.

At the step S17 in FIG. 7, the temporary storage file flag is set to "0." The processing proceeds to a next step S18 to open the temporary storage file, update the temporary storage file flag, and then store the temporary storage file. The processing then proceeds to the step S19 in FIG. 6.

At the step S19 in FIG. 6, whether the user has performed an operation of ending the application (whether the user has selected "end" on a menu, for example) is determined. When the ending operation is performed, the processing proceeds to a step S20 to perform processing for ending the application. When the ending operation is not performed, the processing returns to the step S11.

As described above, in the embodiment (I), the application makes a registration with the OS in advance so that a message generated at the time of simplified user switching is sent from the OS to the application. The application thereafter receives the message and the parameter added to the message that are issued from the OS when processing related to the simplified user switching function is performed. When the user becomes inactive (to be exact, excluding the period of the Welcome Screen), data that has been edited by the user is stored as part of the temporary storage file. Thus, determinations as to the foregoing conditions A and B need to be made on the basis of the message. However, it suffices to determine whether the user is active or not at the time of simplified user switching, and therefore the embodiment has an advantage of reduced overhead.

FIGS. 8 to 11 are a flowchart of an example of processing of the timer-driven embodiment (II).

The present embodiment uses a method of knowing that user switching is performed using the following flag.

"User active flag (or user application active flag)=a flag set at "1" when the user is active and set at "0" when the user is inactive.

The method implemented in the present embodiment is used when an OS incapable of shutdown on the Welcome Screen is installed. A temporary storage file is stored when switching is performed from the Welcome Screen to another user.

In the present embodiment, a timer is driven at intervals of a certain minimal time (about 100 milliseconds) (interval timer interruption) to determine whether the user is active or not. Hence, description will be centered on differences of FIGS. 8 to 11 from FIGS. 4 to 7.

Figure 4:
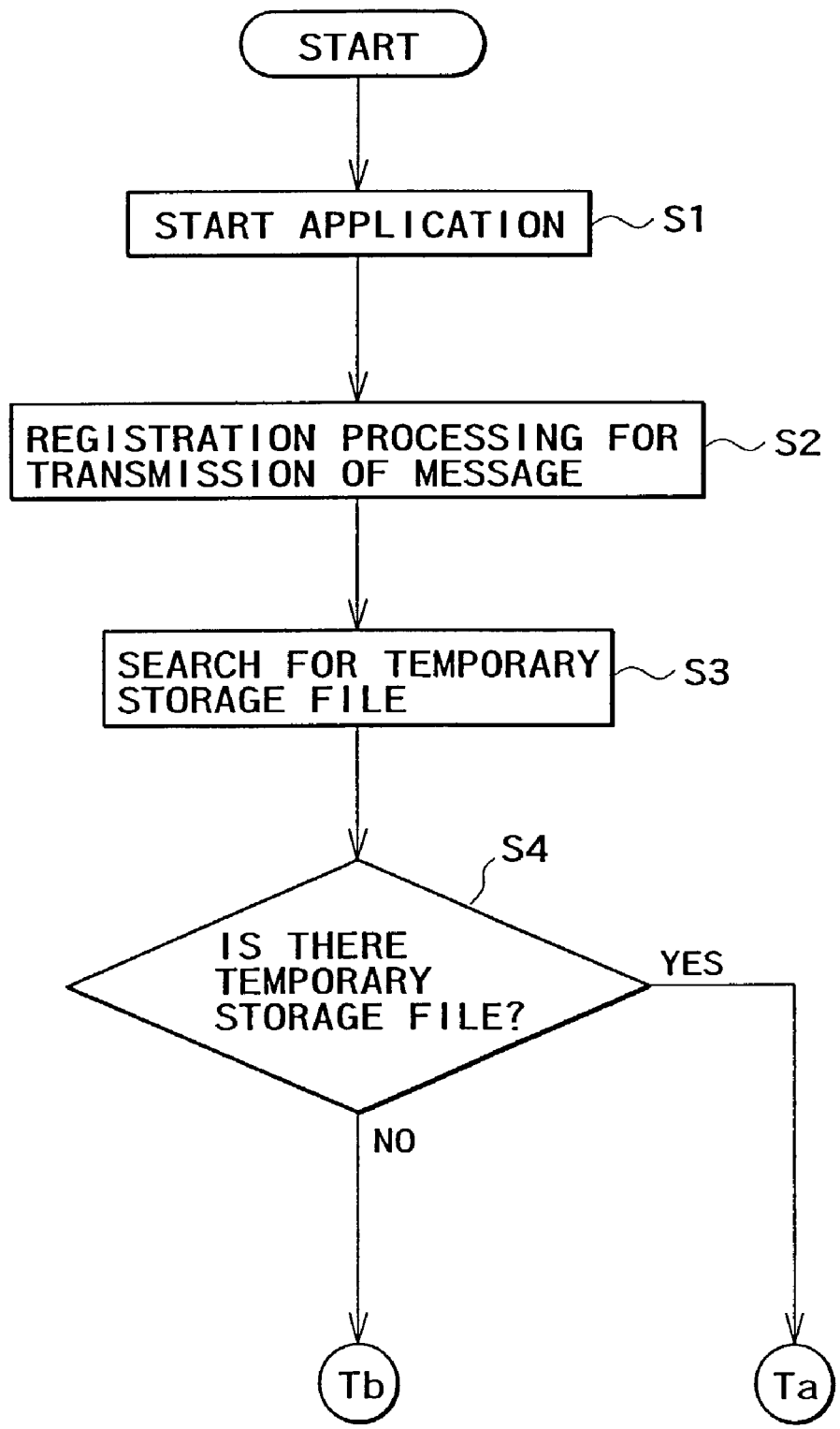
FIG. 4 is a flowchart of assistance in explaining an embodiment using message processing in conjunction with FIGS. 5 to 7, and shows a starting portion of the processing.
Figure 5:
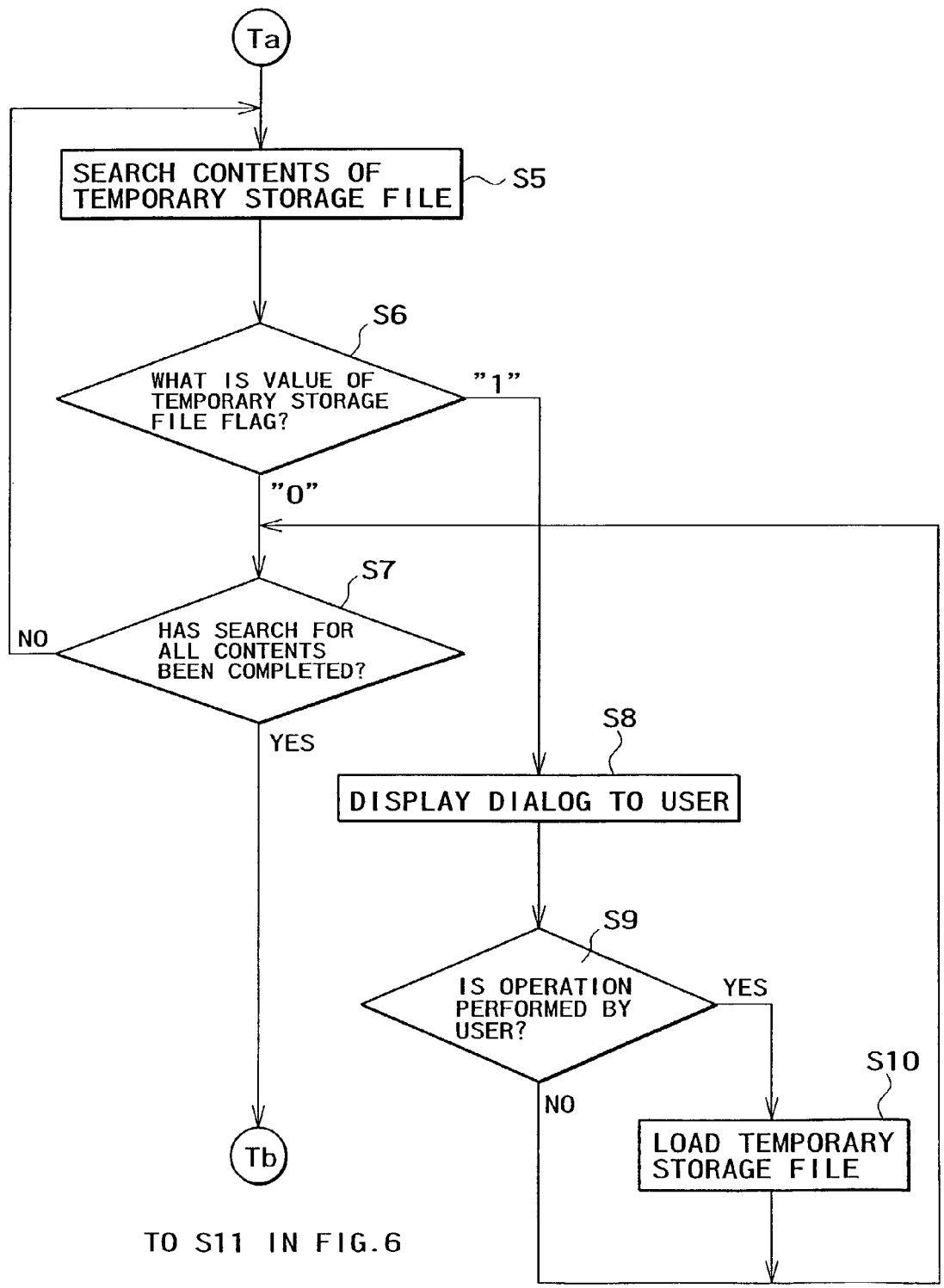
FIG. 5 is a diagram showing a portion succeeding that of FIG. 4.
Figure 8:
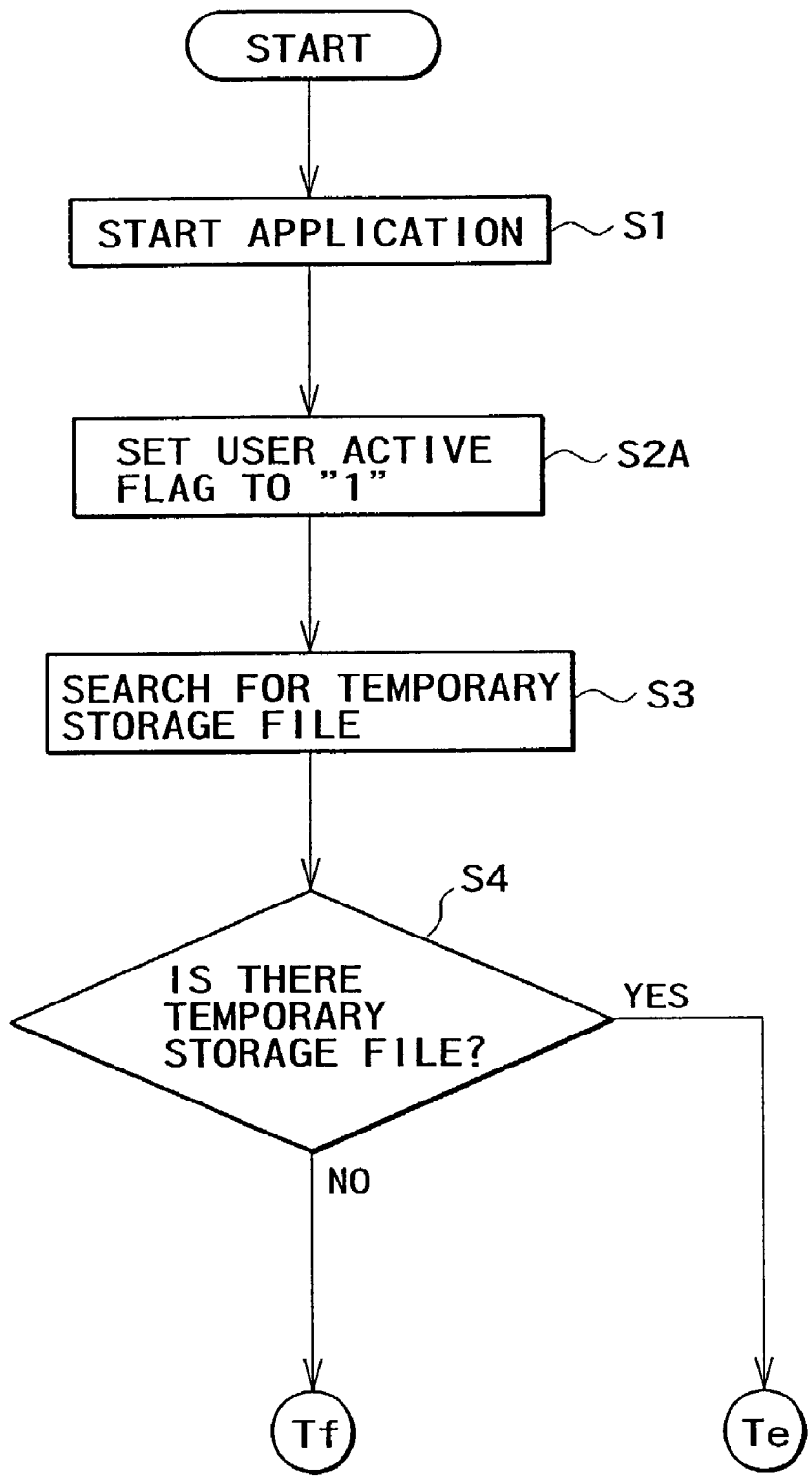
FIG. 8 is a flowchart of main parts of processing of an embodiment using timer driving in conjunction with FIGS. 9 to 11, and shows a starting portion of the processing.

While the first half of the processing is substantially the same as that in FIG. 4 and FIG. 5, processing at a step immediately succeeding a step S1 in FIG. 8 differs. Specifically, the user active flag is set to "1" at a step S2A. The processing then proceeds to a next step S3.

Figure 9:
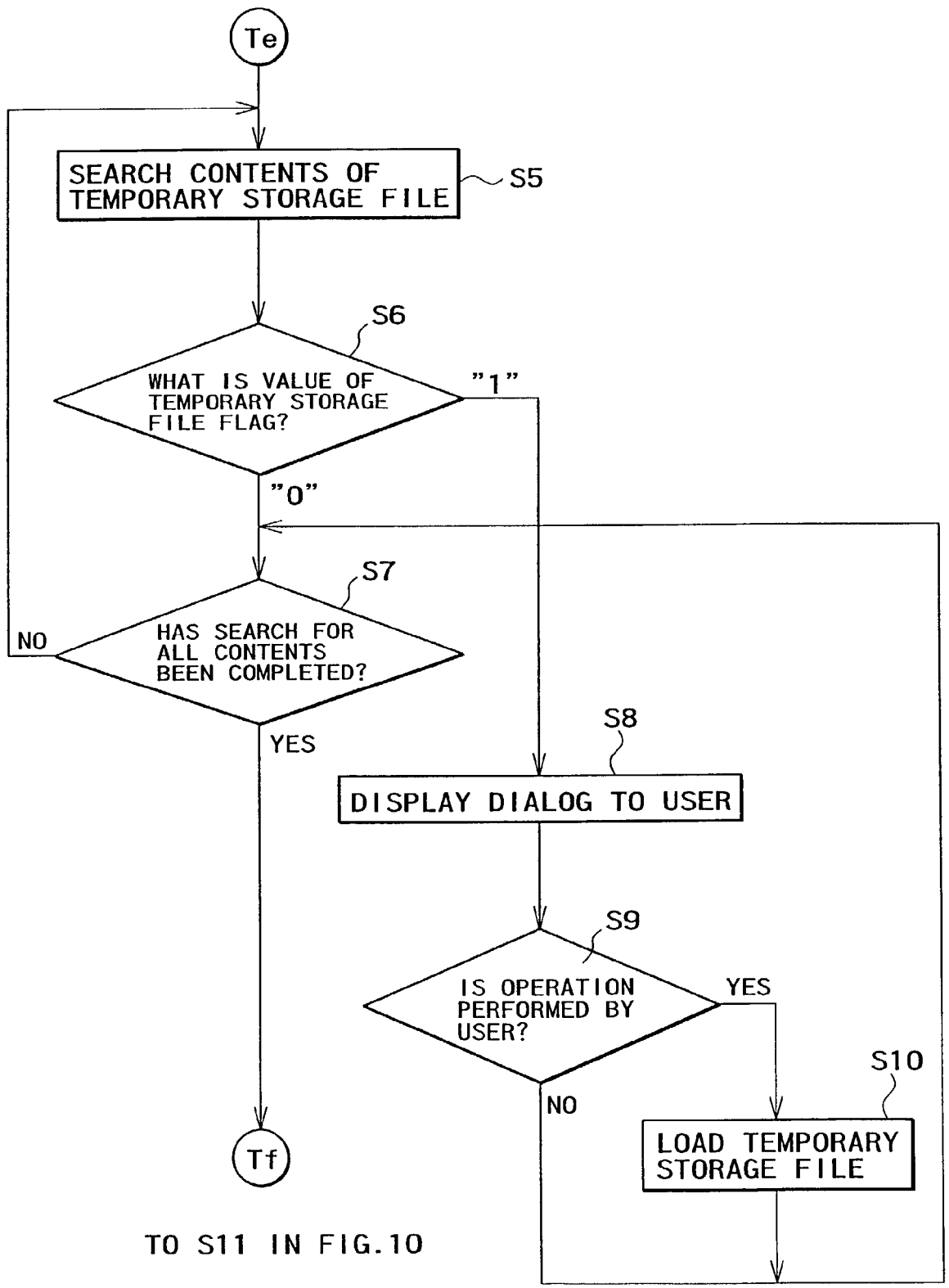
FIG. 9 is a diagram showing a portion succeeding that of FIG. 8.

Processing related to the temporary storage file shown at steps S5 to S10 in FIG. 9 is the same as in FIG. 6. A search is made for a temporary storage file after starting the application. When there is a temporary storage file, the state of the temporary storage file flag (information indicating activity of the temporary storage file) is checked. When the temporary storage file is active (flag value="1"), the temporary storage file is opened according to an instruction from the user or in a forced manner. Incidentally, when a search is made for a temporary storage file and a plurality of such files are found, whether to use the temporary storage files is determined according to the value of their respective temporary storage file flags.

Figure 10:
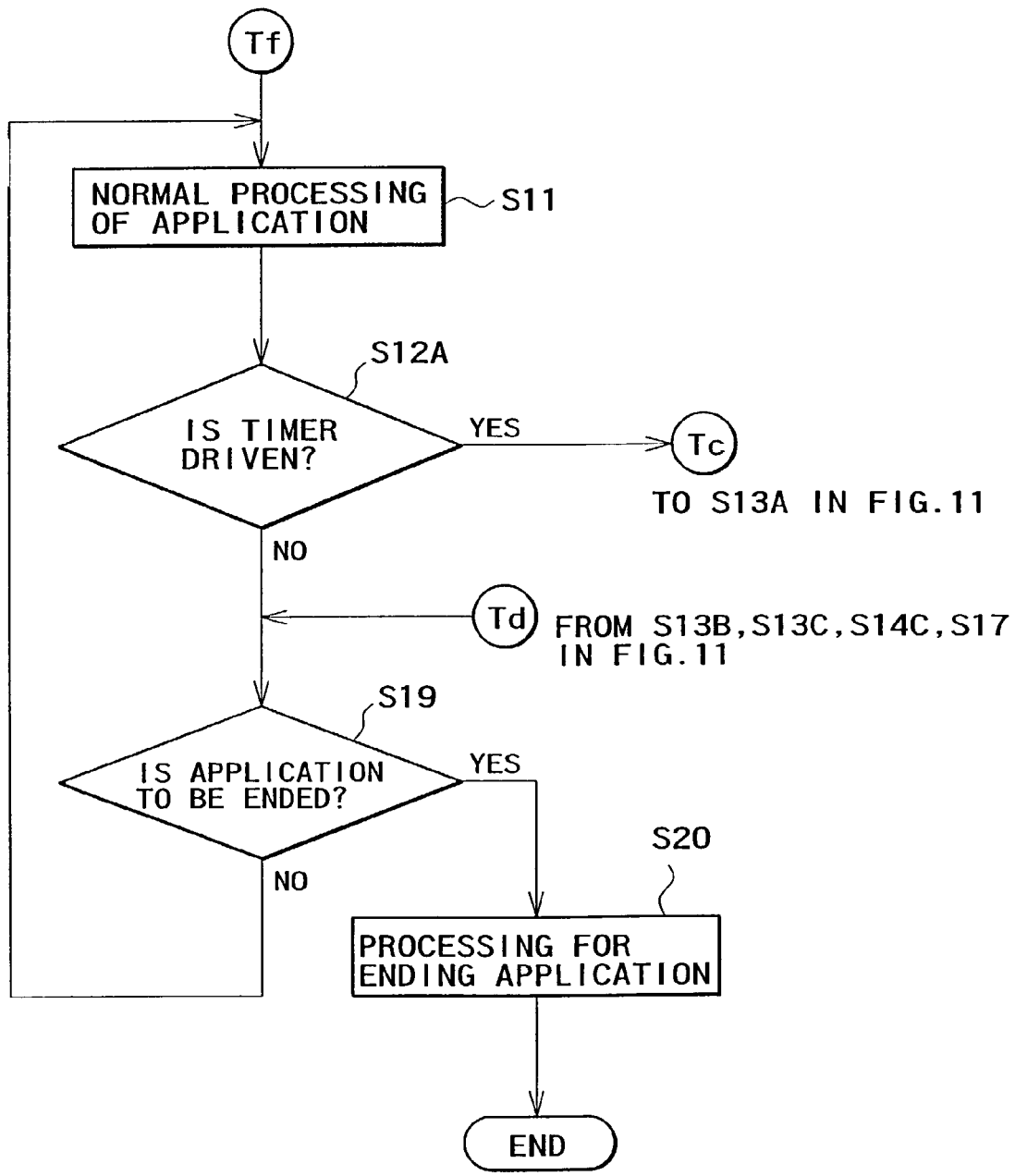
FIG. 10 is a diagram showing the latter half of the processing in conjunction with FIG. 11.

When the processing proceeds from a step S11 in FIG. 10 to a next step S12A, whether the timer is driven to check whether the user is active is determined at the step S12A. When the timer is driven, the processing proceeds to a step S13A in FIG. 11. When the timer is not driven, the processing proceeds to a step S19.

At the step S13A in FIG. 11, whether the user is active is determined. Specifically, when the function "WTSQuerySessionInformation( )" provided by Win32API is called and thereby "WTSActive" is obtained, it is determined that the user is active, and the processing proceeds to a step S13B. At the step S13B, whether the value of the user active flag is "0" is determined. When the value of the user active flag is "0," the processing proceeds to a step S17A. When the value of the user active flag is "1," the processing proceeds to the step S19 in FIG. 10.

At the step S17A in FIG. 11, the temporary storage file flag is set to "0." The processing proceeds to a next step S17B to open the temporary storage file, update the temporary storage file flag, and then store the temporary storage file. The processing then proceeds to a next step S17C to set the user active flag to "1." The processing thereafter proceeds to the step S19 in FIG. 10.

When it is determined at the step S13A in FIG. 11 that the user is not active, the processing proceeds to a step S13C to determine whether the value of the user active flag is "1." When the value of the user active flag is "1," the processing proceeds to a step S14A. When the value of the user active flag is "0," the processing proceeds to the step S19 in FIG. 10.

Processing at the step S14A and a step S14B in FIG. 11 is the same as that of steps S14 and S15 in FIG. 7. At the step S14A, the temporary storage file flag is set to "1." At the step S14B, the temporary storage file is stored (generated). The processing proceeds to a next step S14C to set the user active flag to "0." The processing then proceeds to the step S19 in FIG. 10 (steps S19 and S20 are the same as in FIG. 7).

The present embodiment (II) uses the timer operated at intervals of a preset fixed time. The application calls the function each time the fixed time has passed to determine whether the user is active. An initial value of the user active flag is set to "1" at the time of start of the application (see the step S2A in FIG. 8). Thereafter a state indicated by the flag is compared with a current activity state of the user. When the states differ from each other, it is determined that user switching has been performed. When the user is switched from an active state to an inactive state, data before user switching is stored in the temporary storage file, and data of the file is activated (the temporary storage file flag is set to "1"). When the user is switched from the inactive state to the active state, the user can open the temporary storage file and store the file as required, and hence the temporary storage file is inactivated (the temporary storage file flag is set to "0").

Thus, the embodiments described above provide the following advantages.

When switching is made from the user A to the user B, data of the logged-on user A currently in an inactive state can be protected securely. Specifically, even in a case where the currently active user B shuts down or turns off power, for example, and thereby the application started up the user A is terminated, as long as a temporary storage file is stored at the time of switching to the user B, the user A can load the temporary storage file and thereby restore the data when starting the application next time.

When an application implementing the substance of the present invention is made to be resident and the preregistered file storing processing of another application is performed by a script, even the application not implementing the function of storing a temporary storage file (non-supporting application) can store the data temporarily. Hence, the application becomes convenient and easy to use. In addition, since this function can be used to perform processing of the non-supporting application at the time of simplified user switching, processing such for example as reception of electronic mail, display of a schedule, display for browsing (Web display) using a preregistered address or the like can be registered by a script.

Even when there is a large amount of data or there is only a short time before a shutdown or the turning off of power, data of the user who was active and is currently inactive can be stored securely.

It is to be noted that the present invention is not limited to an information processing apparatus having the foregoing simplified user switching function and a program used for the information processing apparatus; the present invention is widely applicable to information recording media on which an application for realizing the function of data protection using the temporary storage file as described above is recorded (various recording media inserted into apparatus to load a program into memory), a data storing method in an application using the simplified user switching function which method temporarily stores and thereby protects the data of the user rendered inactive by simplified user switching, and the like.

As is clear from the above description, the present the invention has the following advantages:

The apparatus having the simplified user switching function prevents accidental loss of data of the user (who is in an inactive state) as a result of an operation of another user or the like. It is therefore possible to protect the data securely. It is also possible to facilitate use of the simplified user switching function and thereby increase convenience of the simplified user switching function.

The temporary storage file includes information indicating whether the temporary storage file is active or inactive. It is thereby possible to perform processing necessary for restoring data quickly and securely (the file does not need to be opened when the temporary storage file is inactive).

In a situation where loss of data can be expected, the user is allowed to open the temporary storage file after starting the application. It is therefore possible to restore data reliably.

The function of storing a temporary storage file can be added to the application not provided with the function from the beginning.

Determination can be made at the time of user switching using a message and a parameter added to the message. Thus, overhead is reduced.

It can be periodically determined whether or not the user is active without using the message issued at the time of user switching.

While the preferred embodiments of the present invention have been described using the specific terms, such description is for illustrative purposes only, and it is to be understood that changes and variations may be made without departing from the spirit or scope of the following claims.

What is claimed is:

1. An information processing apparatus for operating upon electronic data via a central processing unit, and which supports multiple users, including at least a first user and a second user, by presenting independent and distinct user environments for each user, comprising:

user switching means providing a change in presentation of a display from a first user's independent and distinct user environment to a second user's independent and distinct user environment without completely terminating a first application instance started by the first user, such that there are concurrent logged in users but only one user at a time can be the currently active user, the second user is prevented from sending commands to the first application instance started by the first user, and the first user is prevented from sending commands to a second application instance started by the second user;

wherein at a time of switching the first user to the second user by said user switching means, data of the first application instance started up by the first user that has not yet been stored to a non-volatile storage medium is stored as a temporary storage file on the non-volatile storage medium without further intervention by the first user;

wherein the temporary storage file includes data generated or edited by the first user and information indicating whether the temporary storage file is valid or invalid;

wherein when the first user is brought into an inactive state by switching operation using said user switching means, the information indicating the validity of the temporary storage file is set to indicate that the temporary storage file is valid, and is stored together with the data generated or edited by the first user, and when the first user is brought into an active state, it is determined whether the information stored in the temporary storage file is needed to recover from a data loss, and after any necessary restoration is executed, the temporary storage file is either deleted or the information indicating the validity of the temporary storage file is set to indicate that the temporary storage file is invalid.

2. The information processing apparatus as claimed in claim 1,
   wherein a search for the temporary storage file is performed after start up of the first application instance;
   when the temporary storage file is present, the information indicating the validity of the file is checked; and
   when the file is valid, the temporary storage file is opened.

3. The information processing apparatus as claimed in claim 1,
   wherein said user switching means displays a separate login screen between the presentation of a display from the first user's environment to the second user's environment, and the storing of the first user's data that has not yet been stored is accomplished prior to display of the separate login screen without further intervention by the first user.

4. The information processing apparatus as claimed in claim 1, wherein when the first user logs in and the information processing apparatus determines that a valid temporary storage file exists for the first user and that the computer has been improperly shut down while the first user was the inactive user, the first user is queried on whether to use the temporary storage file to restore data from the temporary storage file, and after any necessary restoration is executed, the temporary storage file is marked invalid or deleted.

5. The information processing apparatus as claimed in claim 1, wherein, after switching and logging in, the second user is not provided with an interface to any program instances previously running under the now inactive first user in the second user's independent and distinct user environment.

6. The information processing apparatus as claimed in claim 1, wherein said information processing apparatus supports two types of applications, a first type of applications which include internal code that supports receiving a message from an operating system running on the information processing apparatus and which stores unsaved data the program itself created, and a second type of applications which do not include internal code that supports receiving a message from the operating system to store unsaved data the program itself created; and
wherein a separate program resident in memory realizes the processing and storing of unsaved data to the temporary storage file for said second type of applications.

7. The information processing apparatus as claimed in claim 1, wherein after switching from the first user to the second user, the first application instance started up by the first user remains in the same state and operating upon the same user data as prior to user switching.

8. The information processing apparatus as claimed in claim 1, wherein the temporary storage file is deleted.

9. A program embodied or stored within a computer-readable storage medium used for an information processing apparatus which supports multiple users, including at least a first user and a second user, by presenting independent and distinct user environments for each user, said program when used with the apparatus comprising:
user switching means providing a change in presentation of a display from a first user's independent and distinct user environment to a second user's independent and distinct user environment without completely terminating a first application instance started by the first user, such that there are concurrent logged in users but only one user at a time can be the currently active user, the second user is prevented from sending commands to the first application instance started by the first user, and the first user is prevented from sending commands to a second application instance started by the second user;
wherein at a time of switching the first user to the second user by said user switching means, data of the first application instance started up by the first user that has not yet been stored to a non-volatile storage medium is stored as a temporary storage file on the non-volatile storage medium without further intervention by the first user;
wherein the temporary storage file includes data generated by the first user and information indicating whether the temporary storage file is valid or invalid; and
when the first user is brought into an inactive state by switching operation using said user switching means, the information indicating the validity of the temporary storage file is set to indicate that the temporary storage file is valid, and is stored together with the data generated or edited by the first user, and when the first user is brought into an active state, it is determined whether the information stored in the temporary storage file is needed to recover from a data loss, and after any necessary restoration is executed, the temporary storage file is either deleted or the information indicating the validity of the temporary storage file is set to indicate that the temporary storage file is invalid.

10. The program used for an information processing apparatus as claimed in claim 9,
wherein a search for the temporary storage file is performed after start up by an active user;
when the file is present, the information indicating the validity of the file is checked; and
when the file is valid, the temporary storage file is opened.

11. The program used for an information processing apparatus according to claim 9, wherein the temporary storage file is deleted.

12. The program used for an information processing apparatus according to claim 9, wherein program supports two types of applications, a first of applications which include internal code that supports receiving a message from an operating system running on the information processing apparatus and which stores unsaved data the program itself created, and a second of applications which do not include internal code that supports receiving a message from the operating system to store unsaved data the program itself created; and
wherein the program itself realizes the processing and storing of unsaved data to the temporary storage file for said second type of applications.

13. The program used for an information processing apparatus according to claim 9, wherein after switching from the first user to the second user, the first application instance started up by the first user remains in the same state and operating upon the same user data as prior to user switching.

14. The program used for an information processing apparatus according to claim 9, wherein said program displays a separate login screen between the presentation of a display from the first user's environment to the second user's environment, and the storing of the first user's data that has not yet been stored is accomplished prior to display of the separate login screen without further intervention by the first user.

15. An information processing system for operating upon electronic data via a central processing unit, and which supports multiple users, including at least a first user and a second user, by providing independent and distinct user environments for each user, said system performing the steps of:
switching an active user of the system from a first user's independent and distinct operating environment to a second user's independent and distinct user environment without terminating a first application instance started by the first user, thereby providing for the ability to support a plurality of users logged into the system simultaneously but wherein only one user at a time can be the currently active user;
wherein during the switching, a separate login screen is presented, and the storing of the first user's data that has not yet been stored is accomplished prior to display of the separate login screen without further intervention by the first user, and
wherein just prior to displaying the separate login screen and prior to switching to the second user, storing data of the first application instance started by the first user that has not yet been stored to a non-volatile storage medium to a temporary storage file on the non-volatile storage medium without further user intervention;
wherein the temporary storage file includes data generated or edited by the first user and information indicating whether the temporary storage file is valid or invalid;
the information processing system performing the additional steps of;
setting the information indicating the validity of the temporary storage file to indicate a valid state when the first user is brought into the inactive state and storing the information together with the data generated or edited by the first user, determining, when the first user becomes active again, whether the information stored in the temporary storage file is needed to recover from a data loss, executing any required restoration of data from the temporary storage file, and deleting the temporary storage file or setting the information indicating the validity of the temporary storage file to indicate an invalid state.

16. The information processing system according to claim 15, said system performing the further step of:

preventing the second user from sending commands to the first application instance started by the first user, and preventing the second user from sending commands to a second application instance started by the second user.

17. The information processing system according to claim 15, said system performing the further step of:

causing the first application instance started up by the first user to remain in the same state and operate upon the same user data as prior to user switching.

18. The information processing system according to claim 15, said system performing the further step of:

processing and storing unsaved data to the temporary storage file for a set of applications which do not include internal code that supports receiving a message from the operating system to store unsaved data the program itself created.

19. An information processing apparatus for operating upon electronic data via a central processing unit, and which supports multiple users, including at least a first user and a second user, by providing separate login of users and presenting independent and distinct user environments for each user, comprising:

user switching means providing a change in presentation of a display from a first user's independent and distinct user environment to a second user's independent and distinct user environment without completely terminating an application instance started by the first user, thereby providing for the ability to support a plurality of concurrently logged-in users but wherein only one user at a time can be the currently active user;

wherein at a time of switching the first user to the second user by said user switching means, data of the application instance started up by the first user that has not yet been stored to a non-volatile storage medium is stored as a temporary storage file on the non-volatile storage medium without further user intervention, and wherein after switching from the first user to the second user, the application instance started up by the first user remains in the same state and operating upon the same user data as prior to user switching;

wherein the temporary storage file includes data generated or edited by the first user and information indicating whether the temporary storage file is valid or invalid; and when the first user is brought into an inactive state by switching operation using said user switching means, the information indicating the validity of the temporary storage file is set to indicate that the temporary storage file is valid, and is stored together with the data generated or edited by the first user, and when the first user is brought into an active state, it is determined whether the information stored in the temporary storage file is needed to recover from a data loss, and after any necessary restoration is executed, the temporary storage file is either deleted or the information indicating the validity of the temporary storage file is set to indicate that the temporary storage file is invalid.

20. The information processing apparatus as claimed in claim 19, wherein said user switching means displays a separate login screen between the presentation of a display from the first user's environment to the second user's environment, and the storing of the first user's data that has not yet been stored is accomplished prior to display of the separate login screen without further intervention by the first user.

* * * * *